United States Patent [19]

Yoshimi et al.

[11] Patent Number: 5,902,845
[45] Date of Patent: May 11, 1999

[54] RUBBER-MODIFIED STYRENIC RESIN COMPOSITION AND ITS MOLDED ARTICLE

[75] Inventors: Shuji Yoshimi; Hayato Kihara; Takahiro Ishii, all of Chiba, Japan

[73] Assignee: Sumitomo Chemical Company, Limited, Osaka, Japan

[21] Appl. No.: 08/609,827

[22] Filed: Mar. 1, 1996

[30] Foreign Application Priority Data

Mar. 1, 1995 [JP] Japan .................................. 7-041892

[51] Int. Cl.$^6$ ........................................ C08L 25/10
[52] U.S. Cl. ........................ 524/267; 521/139; 521/142; 521/146; 521/148; 521/150; 524/284; 524/294; 524/394; 524/414; 524/415; 524/423; 524/451; 524/502; 525/71
[58] Field of Search ...................... 521/139, 142, 521/146, 148, 150; 524/284, 294, 394, 502, 267, 414, 415, 423, 451; 525/71

[56] References Cited

U.S. PATENT DOCUMENTS

| | | |
|---|---|---|
| 3,873,645 | 3/1975 | Muirhead et al. . |
| 3,980,611 | 9/1976 | Anderson et al. . |
| 4,073,764 | 2/1978 | Hemmerich et al. . |
| 4,304,881 | 12/1981 | Aoki et al. . |
| 4,357,170 | 11/1982 | Brand . |
| 4,361,675 | 11/1982 | Tan et al. . |
| 4,639,394 | 1/1987 | Das et al. . |
| 5,039,714 | 8/1991 | Kasahara et al. .................. 521/148 |
| 5,294,656 | 3/1994 | Okamato et al. .................... 525/73 |
| 5,322,869 | 6/1994 | Yamasaki et al. . |
| 5,334,657 | 8/1994 | Swartzmiller et al. ............. 525/71 |
| 5,491,195 | 2/1996 | Schrader et al. .................... 525/71 |
| 5,532,315 | 7/1996 | Bonekamp et al. ................. 525/71 |

FOREIGN PATENT DOCUMENTS

| | | |
|---|---|---|
| A0059908 | 9/1982 | European Pat. Off. . |
| A0266675 | 5/1988 | European Pat. Off. . |
| 0652252 | 5/1995 | European Pat. Off. . |
| A1528094 | 10/1978 | United Kingdom . |

Primary Examiner—John M. Cooney, Jr.
Attorney, Agent, or Firm—Sughrue, Mion, Zinn, Macpeak & Seas, PLLC

[57] ABSTRACT

A rubber-modified styrenic resin composition comprising 100 parts by weight of a rubber-modified styrenic resin (A) having 10 to 40% by weight of the content of a soft component particle and a mean particle diameter of the said particle of 0.1 to 1.2 μm, and 1 to 30 parts by weight of fine particles having a mean particle diameter of 0.1 to 5 μm and not having a glass transition temperature between −130 to 90° C.

A rubber-modified styrenic resin composition having superior plane impact strength, rigidity and gloss, and its molded article are provided.

16 Claims, No Drawings

RUBBER-MODIFIED STYRENIC RESIN COMPOSITION AND ITS MOLDED ARTICLE

FIELD OF THE INVENTION

The present invention relates to a rubber-modified styrenic resin composition and its molded article remarkably improved in a plane impact strength and having a superior rigidity. Particularly, the present invention relates to a rubber-modified styrenic resin composition and a molded article using the said composition remarkably improved in a plane impact strength without compromising desirable other properties, such as, for example, a rigidity, a gloss and the like.

BACKGROUND OF THE INVENTION

A material having an excellent balance of various properties such as a processability at molding, the dimension precision of a molded article, the mechanical properties such as tensile strength, bending strength and the like, a thermal resistance and the like is demanded for application field such as OA equipments, home electronics products and the like. Especially, the enhancement of the balance of a plane impact strength and a rigidity is requested further for an armoring material. This request becomes recently to a higher level still more.

Besides, high level of a plane impact strength and a rigidity is requested for using as a packaging material. In case of using as a cushioning material, an excellent impact-absorbing property is mentioned as one of essential characteristics to be possessed.

However, a rubber-modified styrenic resin composition was not always sufficient to all of the above-mentioned requests. The reason was that a plane impact strength and a rigidity were antipodal properties and when one increased, another decreased and therefore, it was difficult to keep the both properties to a high level.

A method increasing a rigidity and a specific gravity by adding an inorganic filler is widely known but it has a problem that a plane impact strength decreases.

Besides, as a fracture mode at receiving a plane impact, not a brittle fracture but a ductility fracture is preferred. In case of using as an armoring material, it is not preferred that a broken piece of a resin is dispersed when a brittle fracture occurs owing to an impact. However, the greater part of a rubber-modified styrenic resin composition is destroyed in a brittle fracture mode. A rubber-modified styrenic resin composition containing a large amount of soft components is sometimes destroyed in a ductile fracture mode but it has a problem that a rigidity and a gloss are inferior.

As the results of the present inventors's intensive researches and investigations on the above-described problems, the present inventors attained the present invention.

SUMMARY OF THE INVENTION

It is an object of the present invention to provide a rubber-modified styrenic resin composition and its molded article having a superior plane impact strength and rigidity, and a ductile fracture mode at an impact.

According to the present invention, there is provided a rubber-modified styrenic resin composition comprising 100 parts by weight of the following component (A) and 1 to 30 parts by weight of the following component (B):

(A): a rubber-modified styrenic resin having 10 to 40% by weight of the content of a soft component particle and a mean particle diameter of the said particle of 0.1 to 1.2 μm, (B): fine particles having a mean particle diameter of 0.1 to 5 μm and a glass transition temperature out of −130 to 90° C.

Further, according to the present invention, there is provided a molded article using the rubber-modified styrenic resin composition described above.

Other objects and advantages of the present invention will be apparent from the description below.

DETAILED DESCRIPTION OF THE INVENTION

The present invention is illustrated in detail as follows.

A rubber-modified styrenic resin (A) used in the present invention includes a rubber-modified styrenic resin obtained by polymerizing a styrenic monomer or a styrenic monomer with a compound copolymerizable with the styrenic monomer in the presence of a rubbery polymer.

The example of the styrenic resin of the rubber-modified styrenic resin (A) includes a styrene resin, an α-substituted alkyl styrene resin such as α-methyl styrene resin, a nuclear-substituted alkylstyrene resin such as p-methylstyrene resin. Furthermore, the styrenic resins may include a copolymer obtained by copolymerizing a styrenic monomer and a compound copolymerizable with the styrenic monomer for example, a vinyl monomer such as acrylonitrile, methacrylonitrile, methacrylic acid, methylmethacrylate and the like, and furthermore, maleic anhydride, maleimide, nuclear-substituted maleimide and the like.

As the rubbery polymer, there are exemplified polybutadiene, styrene-butadiene copolymer rubbers, ethylene-propylene-non-conjugated diene terpolymer rubbers and the like, and particularly, polybutadiene and styrene-butadiene copolymer rubbers are preferred. As polybutadiene, for example, both high cis-polybutadiene having a high 1,4-cis-content polybutadiene and low 1,4-cis-content polybutadiene can be used.

The rubber-modified styrenic resin (A) used in the present invention, contains a soft component particle of 10 to 40% by weight and preferably 18 to 40% by weight. When the content of soft component particle is too small, the plane impact strength is inferior and when it is too large, the gloss and the rigidity are inferior.

The content of a soft component particle in the rubber-modified styrenic resin (A) is measured by the following method. That is, about 0.5 g of the rubber-modified styrenic resin is sampled by weighing (the weight:$W_1$) and dissolved in 50 ml of a mixed solvent of methylethyl ketone/methanol (the volume ratio of 10/1) at a room temperature (about 23° C.). Next, an insoluble part at the said solving is separated by a centrifugal sedimentation and the insoluble part is dried to measure the weight ($W_2$). The content of a soft component particle in the rubber-modified styrenic resin (A) is determined by ($W_2/W_1$)×100(%).

Mean particle diameter of the said particle is 0.1 to 1.2 μm, preferably 0.1 to 0.3 μm. When the mean particle diameter of the soft component particle is too small, the plane impact strength is inferior and when it is too large, the gloss and the rigidity are inferior.

Mean particle diameter is defined as follows: An ultra thin slice of the rubber-modified styrenic resin composition is prepared and a transmission type electronic microphotograph is taken. The mean particle diameter of the rubbery polymer particles in the microphotograph is measured and calculated with the following equation.

$$\text{The mean particle diameter} = \Sigma(ni \cdot Di^2)/\Sigma(ni \cdot Di)$$

ni is the number of particles having a particle diameter of Di.

In the present invention, the example of the soft component particle in rubber-modified styrenic resin (A) includes the one having a single occlusion structure (which is called as a core/shell structure or a capsule structure) constituted by a nuclear part being a homogeneous continuous phase comprising only the styrenic resin and a shell part comprising a rubbery polymer occluding the said nuclear part or the one having a so-called salami structure wherein the plural small particles of the styrenic resin disperse in a homogeneous continuous phase comprising a rubbery polymer, and the like but it does not restrict the structure specifically. It is referred that the improving effect on a plane impact is high in the single occlusion structure.

Besides, the structure of the soft component particle is observed with a transmission type electronic microscope in like manner as the above-mentioned measurement of mean particle diameter of the soft component particle.

The fine particles as component (B) have a mean particle diameter of 0.1 to 5 μm, preferably 0.1 to 3 μm and do not have a glass transition temperature between −130 to 90° C. When the mean particle diameter of the component (B) is too little, the plane impact strength is inferior and when it is too large, the plane impact strength and the gloss are inferior.

The mean particle diameter of the component (B) is measured for example, by the following method. It is a method wherein the change of the particle concentration is measured when a particle is dispersed in an appropriate solvent and a light is transmitted, and described in detail for example, in a book [An explanatory diagram of powder physical property] (which is edited by Society for the Research of Powder Technology and Institute of Japan Powder Industry and published by Center for Industrial Technology in 1975).

The mean particle diameter of the component (B) is measured by the following method too. That is, an ultra thin slice of the rubber-modified styrenic resin composition is prepared and a transmission type electronic microphotograph is taken. The mean particle diameter of the fine particles in the microphotograph is measured and calculated with the following equation.

The mean particle diameter=$\Sigma(ni \cdot Di^2)/\Sigma(ni \cdot Di)$ (ni is the number of fine particles having a particle diameter of Di.)

Whether the glass transition temperature of the fine particles as component(B) exists or not within −130 to 90° C. can be judged by measuring a differential scanning calorie with a differential scanning calorimeter (DSC) for example, a 7700 type DSC apparatus manufactured by PERKIN ELMER Company. Besides, it is described in detail for example, in a book [A New Experimental Chemistry Course 2 (3. Thermal analytical measurement)] (which is edited by Japan Chemical Society and published by Maruzen Company in 1984; pages: 87 to 122).

The preferable example of the component (B) used in the present invention includes calcium phosphate, barium sulfate, silicic acid, alumina, talc, crosslinked polystyrene beads, beads of crosslinked polydivinyl benzene, beads of crosslinked polymethylmethacrylate and beads of crosslinked styrene-methylmethacrylate copolymer having a mean particle diameter of 0.1 to 5 μm. These fine particles usually in the market can be used.

The crosslinked beads can be synthesized by the well-known method. For example, the beads are synthesized by copolymerizing a polyfunctional monomer such as divinylbenzene, ethylene glycol dimethacrylate and the like at dispersion polymerization of a monomer such as styrene, methylmethacrylate and the like or polymerizing said polyfunctional monomer in the dispersing medium, thereby to give a three dimensional crosslinked structure.

The more preferable example of the component (B) includes calcium phosphate, barium sulfate, silicic acid, alumina, talc, crosslinked polystyrene beads, beads of crosslinked polydivinyl benzene, beads of crosslinked polymethylmethacrylate and beads of crosslinked styrene-methylmethacrylate copolymer having a mean particle diameter of 0.1 to 3 μm.

A method mixing the component (A) and the component (B) is not particularly restricted. The example of the method mixing the component (A) and the component (B) includes any one of methods or a combination thereof among a method adding to a monomer at each stage and polymerization process preparing the rubber-modified styrenic resin (A), a method adding during the polymerization process, a method adding by dry-blending or knead-granulating, a method adding at a molding process and the like. The example of the method adding by dry-blending or knead-granulating includes a method dry-blending the fixed amount of each component with a mixing apparatus such as a Henschel mixer, a tumbler or the like, or a method heating, kneading adequately at a temperature of about 180 to 260° C., with a kneader such as an uni-axial or bi-axial screw type extruder, a Bunbarry mixer or the like and subsequently granulating.

A blending amount of the component (B) is 1 to 30 parts by weight, preferably 1 to 20 parts by weight, more preferably 2 to 20 parts by weight per 100 parts by weight of the rubber-modified styrenic resin (A). When the blending amount of the component (B) is too small, the plane impact strength is inferior and when it is too large, the plane impact strength and the gloss are inferior.

The rubber-modified styrenic resin composition of the present invention may contain an organic polysiloxane.

The blending amount of the organic polysiloxane is 0.5 part by weight or less, preferably 0.01 to 0.5 part by weight per 100 parts by weight of (A) the rubber-modified styrenic resin (A).

The organic polysiloxane used in the present invention is a compound represented by the following formula.

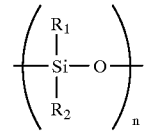

$R_1$ and $R_2$ in the formula indicate an alkyl group, an allyl group and a phenyl group, and n indicates the degree of polymerization. Besides, a compound introducing an epoxy group, an amino group, a carboxylic group, a vinyl group, a hydroxyl group, a fluorine group and an alkoxy group at the end of the chain or in the molecular chain may be well.

The structure of the organic polysiloxane used in the present invention may be any one of a homopolymer, a random polymer, a block polymer and a graft polymer. And, there may be the organic polysiloxane wherein a part of organic group of these organic polysiloxanes is substituted by a hydroxyl group, an alkoxy group or a hydroxyalkyl group.

The example of the organic polysiloxane used in the present invention includes polydimethylsiloxane, polymethylphenylsiloxane, polydiphehylsiloxane and the like. Among these, polydimethylsiloxane and the like are preferred.

The viscosity of the organic polysiloxane is not limited at all and the one being usually about 10 to 100,000 centistokes at 30° C. is easy to be treated.

The method adding and mixing the organic polysiloxane is not specifically restricted and may be for example, any one of methods or combination thereof such as a method adding to a monomer at each stage and polymerization process preparing the rubber-modified styrenic resin (A), a method adding in the middle of polymerization process, a method adding by dry-blending or knead-granulating, a method adding at a molding process and the like.

To the rubber-modified styrenic resin composition of the present invention, an additive such as an anti-oxidant, a heat stabilizer, an ultra-violet absorber, a lubricant, an antistatic agent, a mineral oil, a flame retardant, and the like, can be blended.

The rubber-modified styrenic resin composition of the present invention can provide a molded article having an excellent property. As a molded article, for example, an injection-molded article, an extrusion-molded article and a foamed article are mentioned.

The injection-molded article of the present invention is prepared with an injection-molding machine usually used.

The extrusion-molded article of the present invention is prepared with an extrusion-molding machine usually used.

For example, the foamed article of the present invention is prepared as follows:

Resin beads containing a foaming agent are prepared by a method wherein the pelletized rubber-modified resin composition is suspended into aqueous medium in an autoclave and a volatile foaming agent is impregnated into resin pellets with pressure, or a method wherein after the foaming agent and the resin melted in an extruder are thoroughly mixed, thus mixture is extruded from fine holes of a die tip, conducted immediately in water, cooled quickly and granulated in a state not foaming to prepare expandable resin beads.

The foamed article is prepared with a foaming machine by using the resin beads containing a foaming agent.

The present invention is appropriate for a field for a fabricated goods by injection-molding, a field for a sheet-fabricated goods by extrusion-molding and a field for a fabricated goods by expansion-molding. That is, the injection-molded article and the extrusion-molded article of the present invention are appropriate for an armoring material such as an electronics instrument, a business machine, a telephone, an OA instrument and the like, and a packaging material such as a food receptacle and the like, and the like. Besides, the expansion-molded article of the present invention is appropriate for the use of the so-called shock-absorbing material absorbing an outer impact added to a glass product and various kinds of precision instruments and protecting the said product, and the like.

EXAMPLE

The present invention is illustrated in detail according to the Examples as follows but it is not limited thereto.

The measurement and evaluation methods are illustrated as follows: Besides, items except the following ones were performed as mentioned above.

(1) Flexural modulus (rigidity) was measured in accordance with JIS K7203. The measurement temperature was 23° C.

(2) Dart drop impact strength (Plane impact strength)

A plane sheet with a thickness of 2 mm was injection-molded and a dart of 7.5 kg was dropped naturally from the height of 80 cm to the plane of a test piece by using [Dart drop type graphic impact tester] of Toyo Seiki Seisakusyo. The test piece was destroyed completely or penetrated by a striker settled under the dart. An energy value necessary for this time was determined. Besides, Toshiba IS-150E was used as a molding machine. A molder temperature was 40° C. and a sample size was 150×90×2 mm.

(3) Fracture mode

The sample used in the above-mentioned dart drop impact strength test was judged by eyes. One wherein a fragment scattered was judged as a brittle fracture and one wherein there was plastic deformation and a fragment was not scattered was judged as a ductile fracture.

(4) Gloss (Surface appearance)

A plane sheet with a thickness of 2 mm was injection-molded and the center part was measured in accordance with the specification of the measurement method of a specular gloss at 45 angle of JIS K7105. Besides, Toshiba IS-150E was used as a molding machine. A molder temperature was 40° C. and a sample size was 150×90×2 mm.

Examples 1 to 11 and Comparative Examples 1 to 7

The components shown in Tables 4 and 5 were melted at 220° C. with a 40 mmφ extrusion machine, kneaded, pelletized thereby obtaining compounds shown in Tables 1 to 3. The pellet of each compound obtained was molded to a test piece or a plane sheet and an evaluation was performed. The rubber-modified resin composition (A) prepared by bulk polymerization was used. As the organic polysiloxane, a silicone oil SH 200 (10,000 centistokes) manufactured by Toray Silicone Company was used.

The following can be understood from the result. The Example of the present invention indicates superior results in all of the evaluation items. On the other hand, Comparative Examples 1 and 3 not containing fine particles of the component(B) are inferior in the plane impact strength and Comparative Example 2 containing fine particles of the component(B) having an excessive mean particle diameter is inferior in the plane impact strength. Comparative Examples 4 to 6 having an excessive mean particle diameter of the soft component particles of the component (A) are inferior in the rigidity and the gloss. Comparative Example 7 having an excessive mean particle diameter of the soft component particle of the component (A) and containing an excessive amount of fine particles is inferior in the plane impact strength and the gloss.

TABLE 1

|  | Comparative Example 1 | Example 2 | Example 3 | Example 4 | Example 5 | Example 6 |
|---|---|---|---|---|---|---|
| Blending Parts by weight | | | | | | |
| (A) Rubber-modified polystyrene | A1 | A1 | A1 | A1 | A1 | A1 |
| Amount | 100 | 100 | 100 | 100 | 100 | 100 |
| (B) Fine particle | — | B1 | B1 | B1 | B1 | B1 |
| Amount | 0 | 4 | 10 | 20 | 1 | 10 |

TABLE 1-continued

|  | Comparative Example 1 | Example 2 | Example 3 | Example 4 | Example 5 | Example 6 |
|---|---|---|---|---|---|---|
| (C) Organic polysiloxane | 0 | 0 | 0 | 0 | 0.1 | 0.1 |
| Evaluation |  |  |  |  |  |  |
| Flexural modulus kg/cm$^2$ | 20200 | 20800 | 21600 | 22800 | 20500 | 21700 |
| Dart drop impact strength J | 5.3 | 10.0 | 11.5 | 13.6 | 9.3 | 11.9 |
| Fracture mode | Brittle | Ductile | Ductile | Ductile | Ductile | Ductile |
| Gloss % | 103 | 95 | 93 | 90 | 101 | 93 |

TABLE 2

|  | Example 6 | Example 7 | Example 8 | Example 9 | Comparative Example 2 | Example 10 |
|---|---|---|---|---|---|---|
| Blending Parts by weight |  |  |  |  |  |  |
| (A) Rubber-modified polystyrene | A1 | A1 | A1 | A1 | A1 | A1 |
| Amount | 100 | 100 | 100 | 100 | 100 | 100 |
| (B) Fine particle | B1 | B2 | B3 | B4 | B5 | B6 |
| Amount | 20 | 2 | 2 | 2 | 2 | 2 |
| (C) Organic polysiloxane | 0.1 | 0.1 | 0.1 | 0.1 | 0.1 | 0.1 |
| Evaluation |  |  |  |  |  |  |
| Flexural modulus kg/cm$^2$ | 23400 | 20700 | 20700 | 20800 | 20500 | 20300 |
| Dart drop impact strength J | 10.2 | 13.6 | 8.5 | 11.0 | 3.5 | 13.7 |
| Fracture mode | Ductile | Ductile | Ductile | Ductile | Brittle | Ductile |
| Gloss % | 91 | 95 | 94 | 99 | 94 | 97 |

TABLE 3

|  | Comparative Example 3 | Example 11 | Comparative Example 4 | Comparative Example 5 | Comparative Example 6 | Comparative Example 7 |
|---|---|---|---|---|---|---|
| Blending Parts by weight |  |  |  |  |  |  |
| (A) Rubber-modified polystyrene | A2 | A2 | A3 | A3 | A4 | A4 |
| Amount | 100 | 100 | 100 | 100 | 100 | 100 |
| (B) Fine particle | — | B1 | — | B1 | — | B1 |
| Amount | 0 | 1 | 0 | 1 | 0 | 40 |
| (C) Organic polysiloxane | 0 | 0 | 0 | 0 | 0 | 0 |
| Evaluation |  |  |  |  |  |  |
| Flexural modulus kg/cm$^2$ | 24700 | 24800 | 18900 | 18900 | 14400 | 20500 |
| Dart drop impact strength J | 5.9 | 6.8 | 8.4 | 8.4 | 10.4 | 5.4 |
| Fracture mode | Brittle | Ductile | Ductile | Ductile | Ductile | Brittle |
| Gloss % | 91 | 90 | 85 | 84 | 35 | 23 |

TABLE 4

|  | Component (A) | | | |
|---|---|---|---|---|
| Soft component particle | A1 | A2 | A3 | A4 |
| Mean particle diameter μm | 0.18 | 0.8 | 1.7 | 3.8 |
| Weight % | 24 | 15 | 13 | 24 |
| Morphology | OCC | SAL | SAL | SAL |

*1: OCC structure: Single occulusion structure
*2: SAL structure: Salami structure

TABLE 5

| Component (B) | Kind | Mean particle diameter *1 (μm) | Glass transition temperature (°C.) |
|---|---|---|---|
| B1 | Barium sulfate | 2.5 | *2 |
| B2 | Silicic acid | 2.0 | *2 |
| B3 | Silicic acid | 3.5 | *2 |
| B4 | Alumina | 0.8 | *2 |
| B5 | Alumina | 10.0 | *2 |
| B6 | Crosslinked PS bead *3 | 2.0 | 110 |

*1: Mean particle diameter was measured with an ultra centrifugal type automatic particle distribution measurement instrument CAPA-700 (Dispersion medium: aqueous solution with 60% by weight of glycerine) manufactured by Horiba Seisakusyo Company Ltd..
*2: Glass transition temperature does not exist at −130 to 90° C.
*3: Crosslinked polystyrene beads.

As described above in detail, according to the present invention, there can be obtained a rubber-modified styrenic resin composition remarkably improved in a plane impact strength and having a superior rigidity and a gloss, and can be provided an injection-molded article, an extrusion-molded article and a foamed article using the said the rubber-modified styrenic resin composition.

What is claimed is:

1. A rubber-modified styrenic resin composition comprising 100 parts by weight of a rubber-modified styrenic resin having 10 to 40% by weight of the content of soft component particles and a mean particle diameter of the said particles of 0.1 to 1.2 μm, as a component(A), and 1 to 30 parts by weight of fine particles having a mean particle diameter of 0.1 to 5 μm and not having a glass transition temperature between −130 to 90° C., as a component(B).

2. A rubber-modified styrenic resin composition according to claim 1, wherein the component (B) is a member selected from the group consisting of calcium phosphate, barium sulfate, silicic acid, alumina, talc, crosslinked polystyrene beads, beads of crosslinked polydivinyl benzene, beads of crosslinked polymethylmethacrylate and beads of crosslinked styrene-methylmethacrylate copolymer, having a mean particle diameter of 0.1 to 5 μm.

3. A rubber-modified styrenic resin composition according to claim 1, wherein the content of soft component particles in the component (A) is 18 to 40% by weight and a mean particle diameter of the particles is 0.1 to 0.3 μm and the mean particle diameter of the component (B) is 0.1 to 3 μm.

4. A rubber-modified styrenic resin composition according to claim 3, wherein the component (B) is a member selected from the group consisting of calcium phosphate, barium sulfate, silicic acid, alumina, talc, crosslinked polystyrene beads, beads of crosslinked polydivinyl benzene, beads of crosslinked polymethylmethacrylate and beads of crosslinked styrene-methylmethacrylate copolymer, having a mean particle diameter of 0.1 to 3 μm.

5. A rubber-modified styrenic resin composition according to claim 1, wherein the rubber-modified styrenic resin composition contains 0.5 part by weight or less of an organic polysiloxane per 100 parts by weight of the component (A).

6. A rubber-modified styrenic resin composition according to claim 2, wherein the rubber-modified styrenic resin composition contains 0.5 part by weight or less of an organic polysiloxane per 100 parts by weight of the component (A).

7. A rubber-modified styrenic resin composition according to claim 3, wherein the rubber-modified styrenic resin composition contains 0.5 part by weight or less of an organic polysiloxane per 100 parts by weight of the component (A).

8. A molded article prepared using a rubber-modified styrenic resin composition of claim 1.

9. A molded article prepared using a rubber-modified styrenic resin composition of claim 2.

10. A molded article prepared using a rubber-modified styrenic resin composition of claim 3.

11. A molded article prepared using a rubber-modified styrenic resin composition of claim 5.

12. A molded article according to claim 1, wherein said molded article is an injection-molded article, an extrusion-molded article or a foamed article.

13. A molded article according to claim 8, wherein said molded article is an injection-molded article, an extrusion-molded article or a foamed article.

14. A molded article according to claim 9, wherein said molded article is an injection-molded article, an extrusion-molded article or a foamed article.

15. A molded article according to claim 10, wherein said molded article is an injection-molded article, an extrusion-molded article or a foamed article.

16. A molded article according to claim 11, wherein said molded article is an injection-molded article, an extrusion-molded article or a foamed article.

* * * * *